United States Patent [19]

Rubin

[11] Patent Number: 5,524,382

[45] Date of Patent: Jun. 11, 1996

[54] DECORATIVE ORNAMENT

[75] Inventor: David A. Rubin, Bryn Mawr, Pa.

[73] Assignee: David Alexander, Inc., Philadelphia, Pa.

[21] Appl. No.: 287,012

[22] Filed: Aug. 8, 1994

[51] Int. Cl.⁶ .......................... A01G 17/06; A01G 17/14
[52] U.S. Cl. ...................................................... 47/44; 47/47
[58] Field of Search .......................... 47/44 W, 47, 47 R, 47/47 L

[56] References Cited

U.S. PATENT DOCUMENTS

| 377,444 | 2/1988 | Watrous . | |
|---|---|---|---|
| 510,524 | 12/1893 | Smith . | |
| 587,581 | 8/1897 | Horan . | |
| 620,268 | 2/1899 | Ascher . | |
| 878,494 | 2/1908 | Basse . | |
| 903,986 | 11/1908 | Klahn . | |
| 905,647 | 12/1908 | Case . | |
| 918,579 | 4/1909 | Murch . | |
| 1,529,705 | 3/1925 | McKnight . | |
| 2,083,678 | 6/1937 | Wilson . | |
| 2,659,493 | 11/1953 | Ralston . | |
| 2,732,660 | 1/1956 | Morris . | |
| 3,094,811 | 6/1963 | Feezel . | |
| 3,391,492 | 7/1968 | Attruia | 47/44 W |
| 4,610,106 | 9/1986 | Robinson | 47/47 L |
| 5,048,231 | 9/1991 | Brown . | |
| 5,276,996 | 1/1994 | Lee . | |

FOREIGN PATENT DOCUMENTS

| 344649 | 7/1920 | German Dem. Rep. | 47/44 W |
|---|---|---|---|
| 0356820 | 3/1990 | Germany | 47/44 W |
| 751 | 3/1862 | United Kingdom | 47/44 W |
| 1276944 | 6/1972 | United Kingdom | 47/44 W |

*Primary Examiner*—Dave W. Arola
*Assistant Examiner*—Joanne C. Downs
*Attorney, Agent, or Firm*—Caesar, Rivise, Bernstein, Cohen & Pokotilow, Ltd.

[57] ABSTRACT

A decorative ornament which can be mounted on an inside or outside wall of a house or other structure and which simulates the appearance of a column. The ornament comprises an upper section which simulates the capital of a column, a lower section which simulates the base of a column, and a folded wire strung between the upper and lower sections which has parallel segments simulating the fluting of a column. When mounted on a wall facing a garden or on an inside wall, the ornament can serve as a trellis with the wires supporting plants, flowers or vines.

16 Claims, 6 Drawing Sheets

DECORATIVE ORNAMENT

BACKGROUND OF THE INVENTION

This invention relates generally to decorative ornaments which are wall mounted, and more specifically to a wall mounted decorative ornament which can be mounted on the inside or outside walls of structures, and which can also be used as a trellis for plants, flowers, and climbing vines.

Trellises are in common use. They comprise wires or structures which support climbing foliage. Trellises can be categorized as those that are mounted on walls and those that are staked in the ground. Patents which disclose trellises for supporting flowers, plants or vines which are staked in the ground include U.S. Pat. No. 587,581 (Horan); U.S. Pat. No. 903,986 (Klahn); U.S. Pat. No. 5,048,231 (Brown); U.S. Pat. No. 377,444 (Watrous); U.S. Pat. No. 905,647 (Case); and U.S. Pat. No. 5,276,996 (Lee).

Trellises that are mounted on walls include U.S. Pat. No. 2,732,660 (Morris), which uses upper and lower bars with kinked wires connected therebetween; U.S. Pat. No. 878,494 (Basse), which uses upper and lower bars with support members inbetween; and U.S. Pat. No. 3,094,811 (Feezel), which uses a wooden frame mounted on a wall with clamps to hold the vines.

However, these patents do not disclose a decorative ornament that can be mounted on inside and outside walls which can be used as a trellis and which has an appearance that simulates a column. A single simulated column or a plurality of columns such as a pair of columns on both sides of a portal, door, or window, which resembles columns used in architectural structures, may be used.

OBJECTS OF THE INVENTION

Accordingly, it is the general object of the instant invention to provide a decorative ornament that can be mounted on the outside or inside walls of homes or structures.

It is a further object of the instant invention to provide a decorative ornament that simulates a column.

It is yet a further object of the instant invention to provide a decorative ornament that can serve as a trellis for supporting plants, flowers or vines.

It is still yet a further object of the instant invention to provide a decorative ornament having an upper section that simulates the capital of a column, a lower section that simulates the base of a column, and a folded wire connected therebetween, which simulates the fluting of a column.

It is another object of the instant invention to provide a decorative ornament that can be mounted on a garden wall or the outside wall of a home or structure that faces a garden.

It is still another object of the instant invention to provide a decorative ornament that can be mounted on the inside wall of a house or structure.

It is still yet another object of the instant invention to provide a plurality of decorative ornaments that simulate the appearance of columns and which can be mounted on both sides of a door, portal or window, or that can be mounted in rows, to simulate the appearance of structures that use columns.

It is an additional object of the instant invention to provide a decorative ornament that is inexpensive to manufacture and which can be easily assembled and mounted.

SUMMARY OF THE INVENTION

These and other objects of the instant invention are achieved by providing an upper section which is shaped to simulate the appearance of the capital of a column, a lower section which is shaped to simulate the appearance of the base of a column, and a means for mounting the upper and lower sections to a wall. A wire strung between the upper and lower section simulates the fluting of the column. The decorative ornament can serve as a trellis with the wire supporting plants, flowers or vines.

DESCRIPTION OF THE DRAWINGS

Other objects and many of the intended advantages of this invention will be readily appreciated when the same becomes better understood by reference to the following detailed description, when considered in connection with the accompanying drawings wherein.

DETAILED DESCRIPTION OF THE PREFERRED EMBODIMENTS

Figure 1:
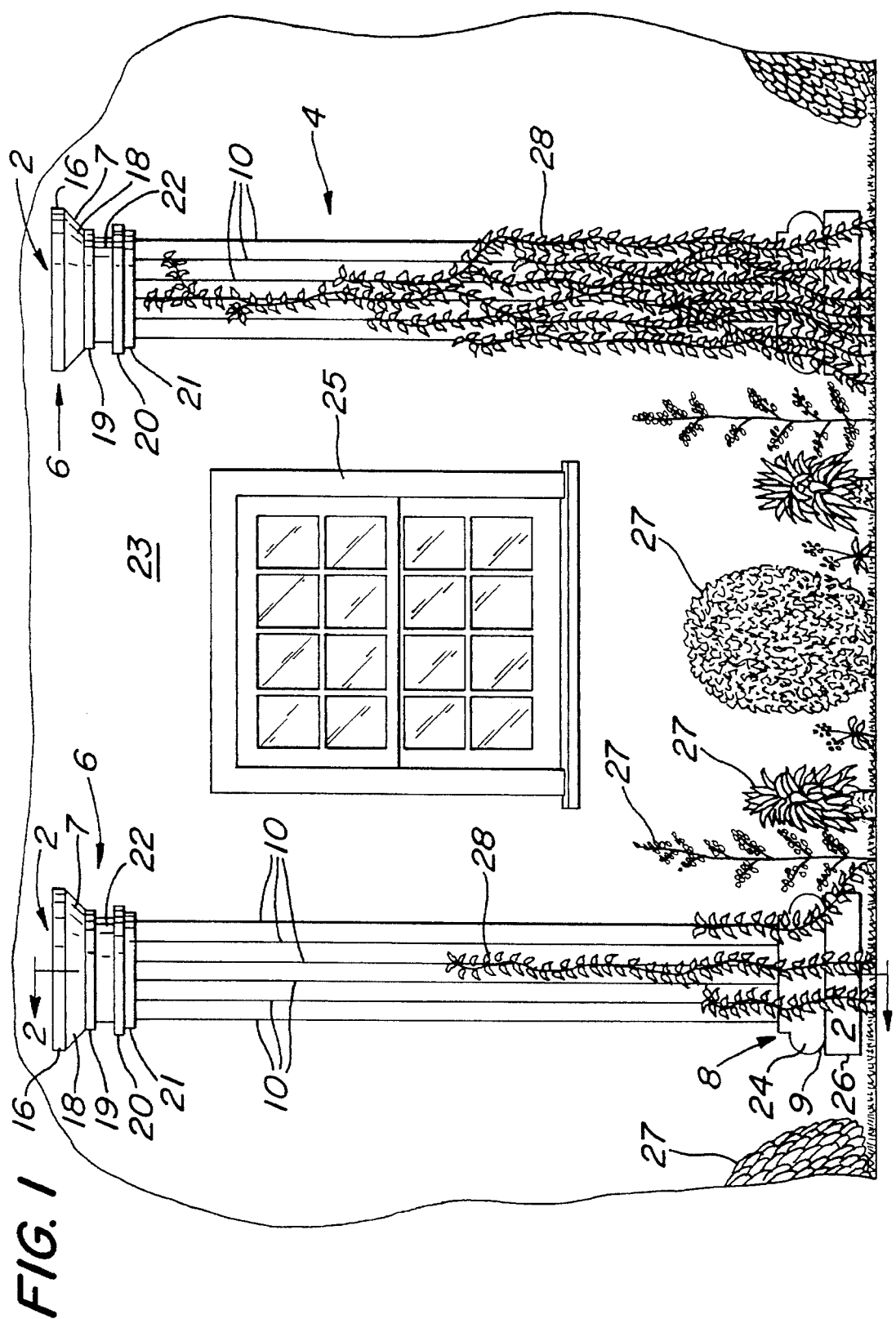
FIG. 1 is a side view of a pair of decorative ornaments mounted on the outside wall of a home or structure on opposite sides of a window facing a garden.

Referring now in greater detail to the various figures of the drawings, wherein like reference characters refer to like parts, there is shown in FIG. 1 a pair of the decorative ornaments 2 of the present invention. Each decorative ornament 2 comprises a simulated column 4 which has an upper section 6 having a facing 7 and a mounting assembly 30 (FIG. 4), a base 8 having a facing 9 and a second mounting assembly 30, and a wire 10. The facing 7 is shaped to simulate the capital of a column, and the facing 9 is shaped to simulate the base of a column. The wire 10 is strung between the upper section 6 and the lower section 8 and in the preferred embodiment, the wire is folded in parallel segments to simulate the fluting of a column.

In further describing the facings 7 and 9, the Latin terms for the sections of the column will be used to identify the various parts of the column. Therefore, as can be seen in FIG. 1, the facing 7 (capital) comprises an abacus 16, an echinus 18 connected to the abacus 16, a necking 22, and first, second and third amulets 19, 20 and 21, respectively. The first amulet 19 is connected between the echinus 18 and the necking 22, the second amulet 20 is connected to the bottom of the necking 22, and the third amulet 21 is connected to the second amulet 20.

The lower section 8 (base) comprises a torus 24 and a plinth 26.

In FIG. 1, two decorative ornaments 2 are mounted to the outside wall 23 of a home or structure on both sides of a window 25. The outside wall 23 faces a garden that has various plants and flowers 27. The ornaments 2 serve as trellises that support vines 28 on the wire 10 strung between the capital and the base.

Figure 5:
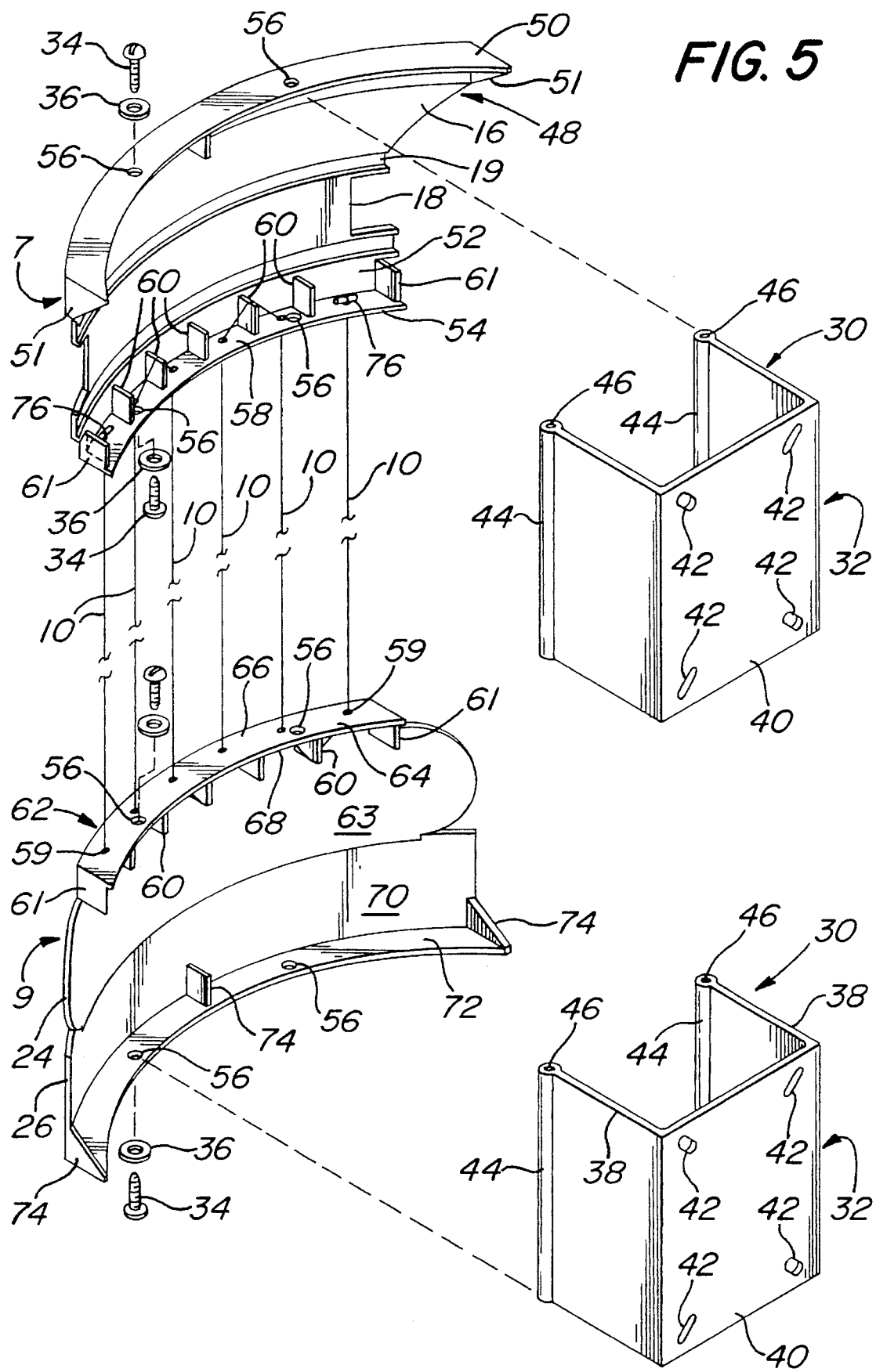
FIG. 5 is a perspective exploded view of the decorative ornament and the mounting brackets showing the attachment of the upper and lower sections of the ornament to the mounting brackets.

Referring now to FIG. 5, it can be seen that the mounting assembly 30 comprises a U-shaped bracket 32 and several screws 34 and washers 36. The bracket 32 comprises opposing side walls 38 and a rear wall 40 with elongated mounting holes 42. The free ends 44 of the opposing side walls 38 are cylindrically shaped and have longitudinally threaded holes 46.

The abacus 16 has a vertically disposed curved section 48 and a horizontally disposed curved shelf 50 with mounting holes 56. The third amulet 21 also has a vertically disposed curved section 52 and a horizontally disposed curved shelf 54 with mounting holes 56. As can be seen in the figure, the facing 7 is placed against the mounting bracket 32 so that the mounting holes 56 on the shelves 50 and 54, respectively, line up with the longitudinal threaded holes 46 for the insertion of screws 34 with washers 36 into the threaded holes 46. The shelf 50 has stiffeners 51 attached to each end and the center of the shelf 50, and the shelf 54 has stiffeners 61 attached to each end in order to provide strength and stability to the shelves.

In a similar fashion, the facing 9 is mounted on a second bracket 32. The torus 24 comprises a vertically disposed curved section 63 and a horizontally disposed shelf 64 with mounting holes 56. The plinth 26 comprises a vertically disposed curved section 70 and a horizontally disposed curved shelf 72 with mounting holes 56. Screws 34 are placed through washers 36 into mounting holes 56 and threaded into the longitudinal threaded holes 46 to mount the facing 9 to the mounting bracket 32.

Figure 2:
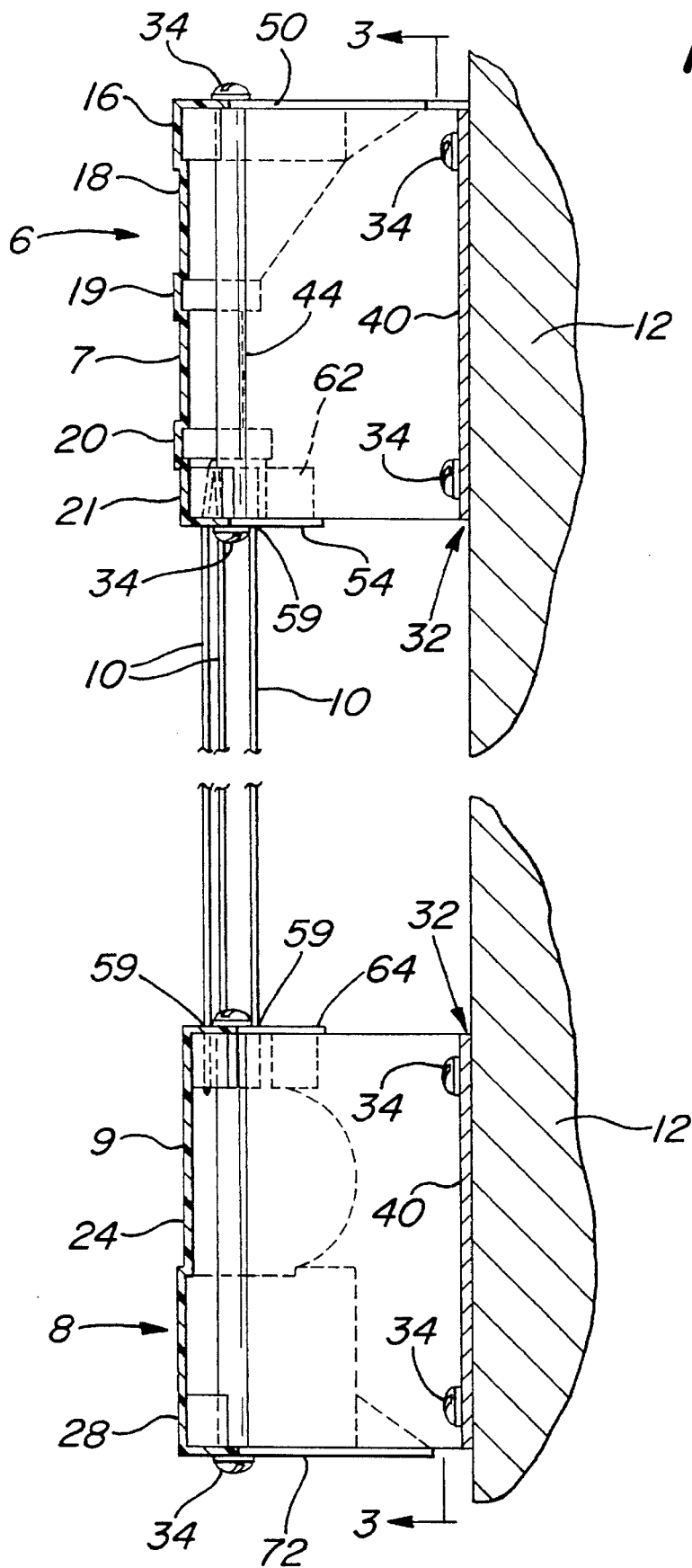
FIG. 2 is a sectional view of the decorative ornament taken along the line 2—2 of FIG. 1.
Figure 3:
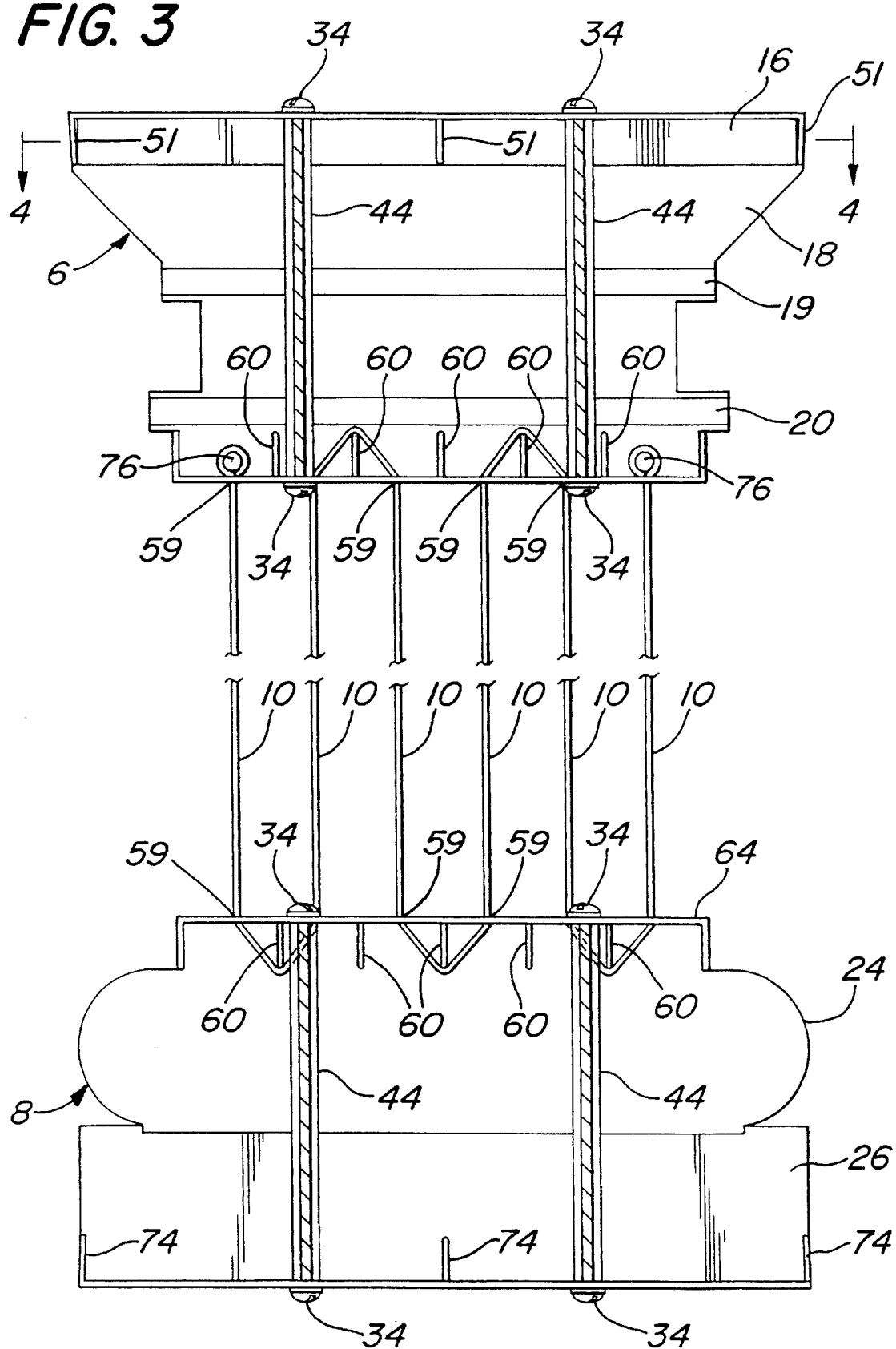
FIG. 3 is a sectional view of the decorative ornament taken along the line 3—3 of FIG. 2.
Figure 4:
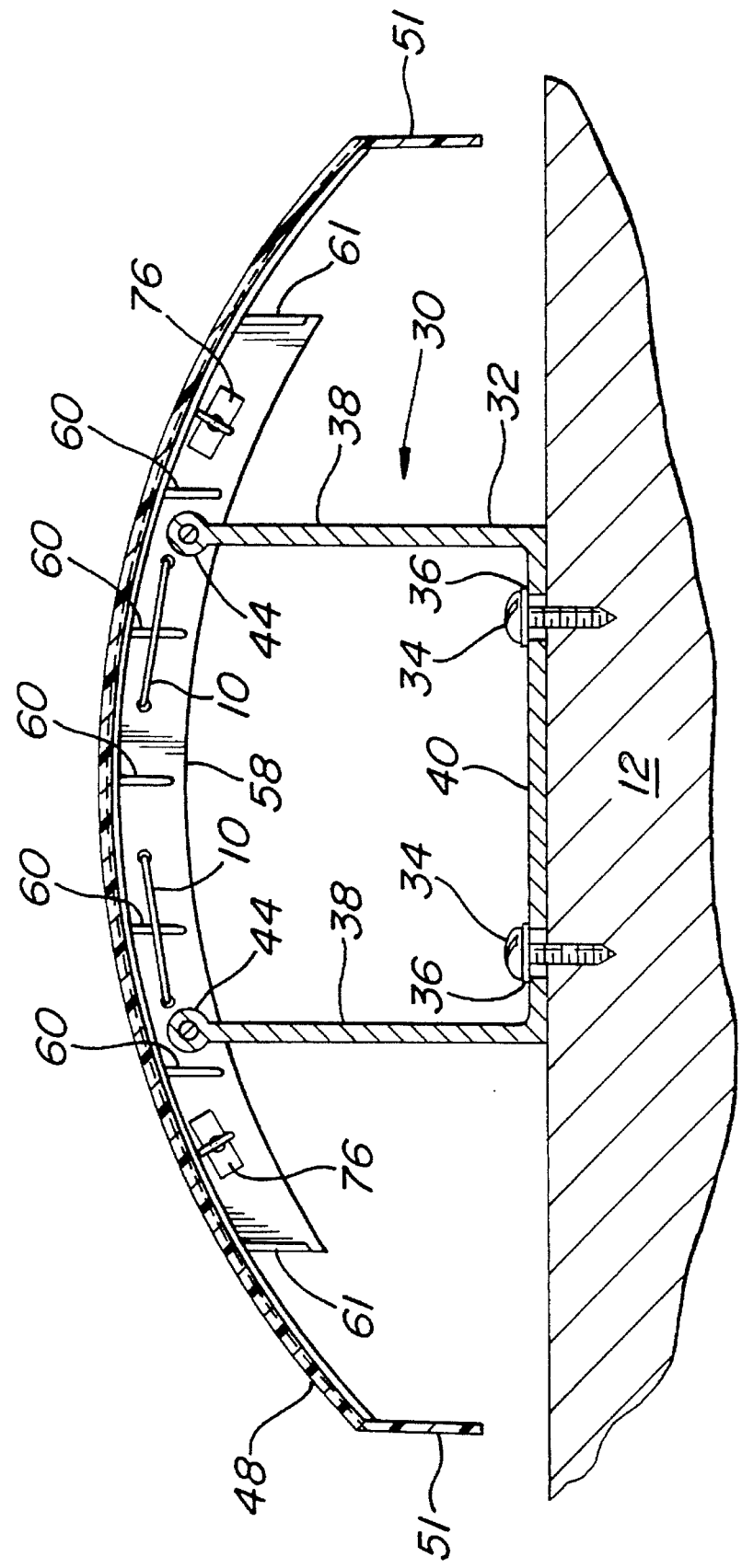
FIG. 4 is a sectional top view of the upper section of the decorative ornament taken along the line 4—4 of FIG. 3.

Referring now to FIGS. 2–5, it can be seen that the horizontally disposed shelves 54 and 64 have holes 59 through which the wire 10 is threaded. The shelf 54 has a top surface 58 upon which spaced dividers 60 are mounted and the shelf 64 has a top surface 66 and a bottom surface 68 upon which the spaced dividers 60 are also mounted. The purpose of the dividers 60 is to reduce the angle of the wire 10 as it is threaded through the holes to prevent weakening the wire and possible breakage caused by sharp bending. As can be seen in FIGS. 3–5, the wire 10 is laced through the holes 59 and over alternate spaced dividers 60. Also, as can be seen in FIGS. 2 and 4, the screws 34 are placed through holes 42 into the wall 23 to mount the mounting bracket 32 to the vertical surface 12.

Finally, it should be noted that the horizontally disposed curved shelf 72 has stiffeners 74 to add stability and strength to the shelf 72 and the curved section 70. Each end of the wire 10 is wrapped around a peg 76 to provide a holding means for the wire.

Figure 6:
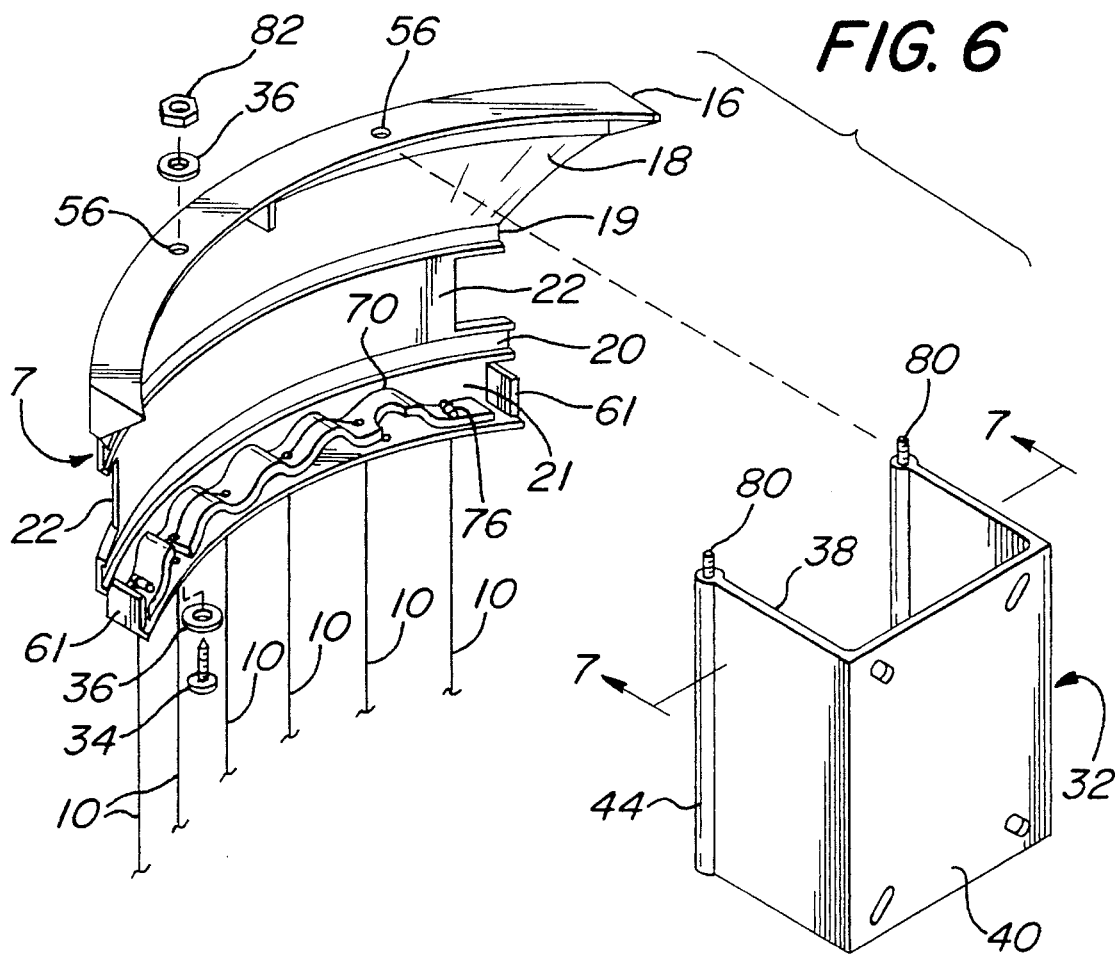
FIG. 6 is a perspective exploded view of the upper section and mounting bracket of the decorative ornament showing an alternative means for threading and stringing the wires between the upper and lower sections.
Figure 7:
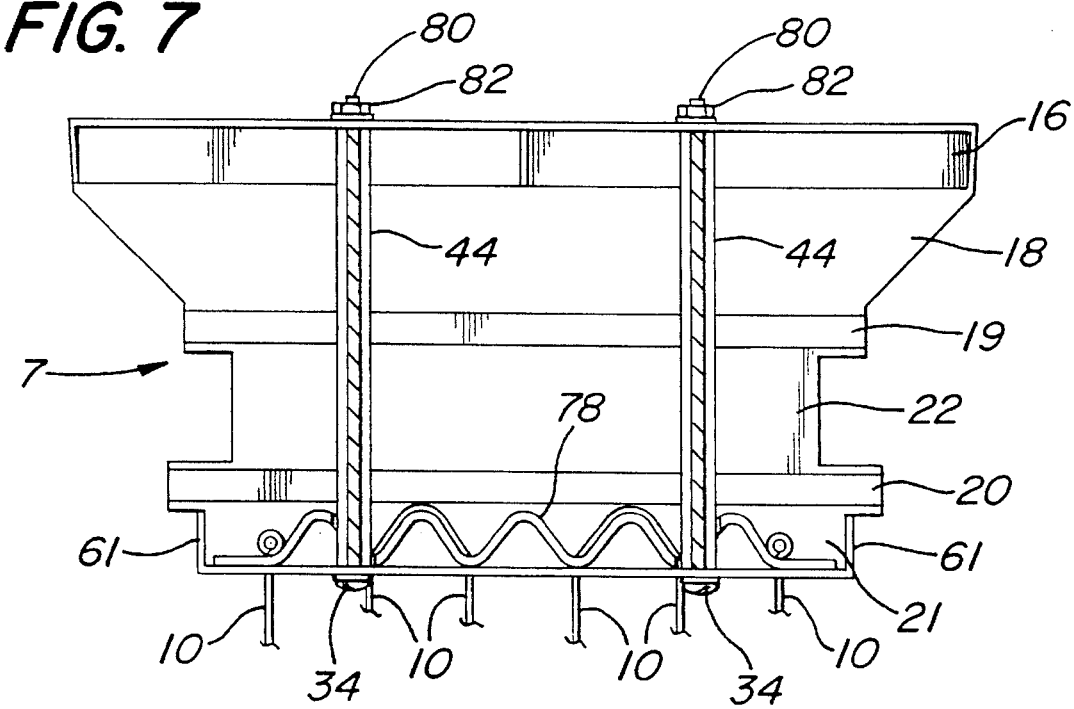
FIG. 7 is a sectional view of the upper section of the decorative ornament connected to the mounting bracket taken along the line 7—7 of FIG. 6.

An alternative embodiment of the decorative ornament 2 is shown in FIG. 6 wherein the ornament 2 comprises an undulating member 78 to reduce the sharpness of the angles of the wire 10 as it is threaded between the facing 7 and the facing 9, instead of the divider 60 used in the first embodiment. In addition, it should be noted that the bracket 32 has threaded studs which protrude from the cylindrically shaped free ends 44. As can be seen in FIG. 7, screws 34 are threaded into the bottom openings of the longitudinal holes 46 and a nut 80 with a washer 82 is secured to the threaded studs 80 to mount the upper member 8 to the mounting bracket 32.

A decorative ornament has been described which simulates the appearance of a column and which can be mounted on the inside or outside walls of structures. When mounted above or near plants, flowers or vines, the ornament can be used as a trellis.

I claim:

1. A decorative ornament to be mounted on a vertical surface, said ornament comprising:
    (a) a first upper section to be mounted on the vertical surface, said upper section being comprised of: a first facing member and a first mounting means mountable onto the vertical surface for mounting said first facing member onto the vertical surface, said first facing member having a plurality of adjacent spaced holes therethrough, including wire holes for passing wire therethrough;
    (b) a second lower section to be mounted onto the vertical surface below and spaced from said first upper section, said second lower section being comprised of: a second facing member and a second mounting means mountable onto the vertical surface for mounting said second facing member onto the vertical surface, said second facing member having a plurality of adjacent spaced holes therethrough, including wire holes for passing wire therethrough;
    (c) continuous wire means to be attached to said first facing member and extending between said first facing member and said second facing member through said wire holes in the first and second facing members; and
    (d) wire support means between adjacent wire holes through said first and second facing members for supporting said wire means thereon when said wire means passes through adjacent wire holes in said facing members.

2. The decorative ornament of claim 1; wherein said first facing member comprises a first portion shaped to simulate the abacus of a column, a second portion shaped to simulate the echinus of a column, at least one third portion shaped to simulate the amulet of a column, and a fourth portion shaped to simulate the necking of a column.

3. The decorative ornament of claim 1, wherein said first mounting means comprises a first mounting assembly having a first u-shaped bracket, said first u-shaped bracket comprising a rear wall and a pair of opposing side walls extending from said rear wall, each of said side walls having a cylindrically shaped free end having a longitudinal hole therethrough.

4. The decorative ornament of claim 3, wherein said first mounting means further comprises a plurality of screws and washers for attaching said first u-shaped bracket to the vertical surface and for attaching said first facing member to said first u-shaped bracket.

5. The decorative ornament of claim 4, wherein said first facing member comprises a first vertical section and a first horizontal shelf extending from said first vertical section, said first shelf having holes therethrough for insertion of at least one of said screws into at least one of said longitudinal holes of said first u-shaped bracket, and further comprises a second horizontal shelf extending from said first vertical section beneath said first horizontal shelf, said second horizontal shelf having at least one hole for inserting one of said screws therethrough into said longitudinal holes of said first bracket and said wire holes through which said wire means passes.

6. The decorative ornament of claim 5, wherein said second mounting means comprises a second mounting assembly having a second u-shaped bracket, said second u-shaped bracket being comprised of a rear wall, and a pair of opposing side walls extending from said rear wall, said side walls each having a cylindrically shaped free end having a longitudinal hole therethrough.

7. The decorative ornament of claim 6, wherein said second facing member comprises a second vertical section and a third horizontal shelf extending from said second vertical section, said third shelf having holes therethrough for insertion of at least one of said screws therethrough into at least one of said longitudinal holes of said second u-shaped bracket and said wire holes through which said wire means passes and further comprises a fourth horizontal shelf extending from said second vertical section beneath said third horizontal shelf, said fourth horizontal shelf having at least one hole for inserting one of said screws therethrough into at least one of said longitudinal holes of said second bracket.

8. The decorative ornament of claim 7, wherein said rear walls of said first and second u-shaped brackets have holes for insertion of said screws therethrough into the vertical surface.

9. The decorative ornament of claim 1, wherein said second facing member comprises a member shaped to simulate the torus of a column and a member shaped to simulate the plinth of a column.

10. The decorative ornament of claim 1, wherein said wire support means is comprised of first vertical dividers positioned on said first facing member between adjacent ones of said wire holes, whereby passing said wire means through said wire holes causes said wire means to pass over said first vertical dividers between said wire holes and causes said wire means to be supported thereby.

11. The decorative ornament of claim 10, wherein said wire support means is further comprised of second vertical dividers positioned on said second facing member between adjacent ones of said wire holes through which said wire means passes, whereby passing said wire means through said wire holes causes said wire means to pass over said first and second vertical dividers between said wire holes of the first and second facing members and causes said wire means to be supported thereby.

12. The decorative ornament of claim 1, wherein said wire support means is comprised of a pair of pegs, one peg anchoring each end of said wire to said first upper section.

13. The decorative ornament of claim 1, wherein said wire support means is comprised of a first undulating member positioned over the wire holes through said first facing member, whereby passing said wire means through said holes in said first facing member causes said wire means to pass over said first undulating member between said wire holes in said first facing member and causes said wire means to be supported thereby.

14. The decorative ornament of claim 13, wherein said wire support means is further comprised of a second undulating member positioned over the wire holes through said second facing member, whereby passing said wire means through said wire holes in said first and second facing members causes said wire means to pass over said first and second undulating members between said wire holes and causes said wire means to be supported thereby.

15. The decorative ornament of claim 1, wherein the vertical surface is the inside wall of a structure.

16. The decorative ornament of claim 1, wherein the vertical surface is the outside wall of a structure.

* * * * *